United States Patent
Ariyoshi et al.

(10) Patent No.: US 10,027,379 B2
(45) Date of Patent: Jul. 17, 2018

(54) COMMUNICATION DEVICE

(71) Applicant: OMRON Corporation, Kyoto-shi, Kyoto (JP)

(72) Inventors: Tomonori Ariyoshi, Kusatsu (JP); Hiroaki Motoshima, Takatsuki (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/161,371

(22) Filed: May 23, 2016

(65) Prior Publication Data
US 2016/0352392 A1 Dec. 1, 2016

(30) Foreign Application Priority Data

May 29, 2015 (JP) .................................. 2015-110278

(51) Int. Cl.
*H04B 5/00* (2006.01)
*H04B 1/04* (2006.01)

(52) U.S. Cl.
CPC ......... *H04B 5/0062* (2013.01); *H04B 1/0475* (2013.01)

(58) Field of Classification Search
CPC .. H04B 5/0062; H04B 5/0068; H04B 5/0075; H04B 7/0871; H04W 4/008
USPC .................... 455/230, 193.1; 340/572.1, 10.1
See application file for complete search history.

(56) References Cited

U.S. PATENT DOCUMENTS

| 2,061,710 | A | * | 11/1936 | McCaa | ..................... H03G 3/22 455/236.1 |
| 3,778,728 | A | * | 12/1973 | Nupp | ..................... H03B 5/1203 329/326 |
| 4,556,864 | A | * | 12/1985 | Roy | ........................ H04B 3/542 329/313 |
| 6,646,566 | B1 | * | 11/2003 | Tanguay | .................. G08B 3/10 340/384.1 |
| 7,330,708 | B2 | * | 2/2008 | Umewaka | ............... B60R 25/24 340/10.3 |

(Continued)

FOREIGN PATENT DOCUMENTS

| CN | 101276396 A | 10/2008 |
| JP | 2001-177435 A | 6/2001 |
| JP | 2013-062605 A | 4/2013 |

*Primary Examiner* — Edward Urban
*Assistant Examiner* — Max Mathew
(74) *Attorney, Agent, or Firm* — Metrolexis Law Group, PLLC

(57) ABSTRACT

There has been a demand for a technique of expanding a communicable range as much as possible without increasing the time required for communication between an RF tag and a communication device. A communication device includes: a terminal electrically connected with an antenna; a transmitter electrically connected with the terminal and configured to generate a first radio signal superimposed with a predetermined command signal and transmit the first radio signal from the antenna; an amplifier electrically connected with the terminal and configured to receive from the antenna a second radio signal generated by an RF tag receiving the first radio signal; a detector configured to detect intensity of the signal having been amplified by the amplifier; and a suppressor configured to suppress the intensity of the amplified signal to be inputted into the detector such that the intensity does not exceed a predetermined upper limit.

19 Claims, 9 Drawing Sheets

(56) References Cited

U.S. PATENT DOCUMENTS

| | | | |
|---|---|---|---|
| 7,902,961 B2* | 3/2011 | Yamazoe | G01D 21/00 340/10.1 |
| 2004/0198285 A1* | 10/2004 | Umewaka | G06K 19/0723 455/232.1 |
| 2005/0237035 A1* | 10/2005 | Reilly | G05F 1/66 323/208 |
| 2007/0129039 A1* | 6/2007 | Sherrets | G06K 7/0008 455/230 |
| 2008/0238632 A1 | 10/2008 | Endo et al. | |
| 2009/0201426 A1* | 8/2009 | Sano | H04N 5/52 348/678 |
| 2010/0178889 A1* | 7/2010 | Kato | H04B 1/0475 455/193.1 |
| 2013/0169247 A1* | 7/2013 | Onouchi | G05F 1/59 323/269 |
| 2015/0271753 A1* | 9/2015 | Matsuda | H04W 52/0219 370/311 |
| 2016/0072490 A1* | 3/2016 | Sano | H03K 5/1252 375/222 |
| 2016/0351182 A1* | 12/2016 | Heo | G10K 11/178 |
| 2017/0093939 A1* | 3/2017 | Bar-Mashiah | H04L 65/4069 |

\* cited by examiner

COMMUNICATION DEVICE

CROSS-REFERENCE TO RELATED APPLICATION

This application is based on Japanese Patent Application No. 2015-110278 filed with the Japan Patent Office on May 29, 2015, the entire contents of which are incorporated herein by reference.

FIELD

The present invention relates to a communication device having contactless communication with an RF (Radio Frequency) tag.

BACKGROUND

The near field communication technology for contactless data exchange has been used in a variety of fields. Typically, the near field communication technology called Radio Frequency IDentification (RFID) is in widespread use. As one example, the RFID system is used in the Factory Automation (FA) field, such as quality control in a manufacturing process. More specifically, an RF tag which stores data such as identification information is fitted to an article that is a management target, or an object (pallet, container, and the like) for supporting or accommodating the article. Further, a communication device (hereinafter also referred to as a "reader-writer") for exchanging data with the RF tag is disposed in the vicinity of a channel in which the article or the object fitted with the RF tag moves.

There are cases where an antenna of the reader-writer is installed in a position distant from the RF tag that is the communication target, and where the antenna is installed in a position near the RF tag that is the communication target, in accordance with facilities or a device for the installation.

In order to establish stable communication between the reader-writer and the RF tag, an installation margin of the reader-writer (a communicable distance to the RF tag (a communicable area range)) is preferably as large as possible. That is, it is preferable to install the antenna such that a difference between the maximum data receivable distance from the RF tab and the minimum data receivable distance from the RF tag is made as large as possible. The longer the distance between the antenna and the RF tag, the smaller a voltage of a reception signal (hereinafter referred from "reception voltage") from the RF tag. The shorter the distance between the antenna and the RF tag, the larger the reception voltage from the RF tag. When a voltage dynamic range of a circuit for restoring the reception signal from the RF tag is narrow, the reception voltage is restricted to be either excessively low or excessively high. In order to deal with such a problem, a solution as described below has been proposed.

For example, Unexamined Japanese Patent Publication No. 2001-177435 discloses a contactless ID tag system. For coping with the problem of being unable to accurately read data due to a fixed amplification factor of a reception amplifier, this contactless ID tag system can discriminate and switch between a weak electric field and a strong electric field, to accurately receive ID data with excellent reception sensitivity.

Further, Unexamined Japanese Patent Publication No. 2013-062605 discloses a load modulation communication control device capable of keeping a dead zone small. More specifically, when confirming that bit determination has been failed despite the existence of an I-phase signal or a Q-phase signal, a reception error monitoring unit determines that a load modulation signal has been received but its reception intensity is excessively high. At this time, a resister setting unit rewrites a resister to lower a gain of a variable reception amplifier to lower amplitude of the load modulation signal in reception signal determination. With the reception amplifier gain in the low state, a communication re-execution unit re-executes the communication, to establish load modulation communication.

SUMMARY

In each of the prior arts disclosed in Unexamined Japanese Patent Publication No. 2001-177435 and Unexamined Japanese Patent Publication No. 2013-062605 above, the reception gain is previously adjusted so as to allow maximization of the communicable distance, and when reception with the adjusted reception gain is failed, the reception gain is lowered and the communication is performed again, to ensure the installation margin of the reader-writer. When the method of the prior art as described above is employed, the processing of changing the reception gain and performing the communicating again, namely retry processing, is required. This causes the problem of increasing the time required for the communication.

On the basis of the background as described above, there has been a demand for a technique of expanding the communicable range as much as possible without increasing the time required for the communication between the RF tag and the communication device.

A communication device according to one aspect of the present invention includes a terminal, a transmitter, an amplifier, a detector, and a suppressor. The terminal is electrically connected with an antenna. The transmitter is electrically connected with the terminal, generates a first radio signal superimposed with a predetermined command signal and transmits the first radio signal from the antenna. The amplifier is electrically connected with the terminal and receives from the antenna a second radio signal generated by an RF tag receiving the first radio signal to amplify the second radio signal. The detector detects intensity of the signal having been amplified by the amplifier. The suppressor suppresses the intensity of the amplified signal to be inputted into the detector such that the intensity does not exceed a predetermined upper limit.

It is preferable that the suppressor extract an alternating current (AC) component contained in the amplified signal and set an upper limit and a lower limit of the amplitude.

It is further preferable that the suppressor include a pair of diodes connected in different directions from each other.

It is further preferable that the suppressor include a first buffer configured to amplify the signal before extracting the AC component.

It is further preferable that, after setting the upper and lower limits of the amplitude, the suppressor add a direct current (DC) component to the signal and output the signal to the detector.

It is further preferable that the suppressor include a second buffer provided in an output stage to the detector.

It is further preferable that the suppressor include a circuit configured to compensate a loss that occurs due to signal suppression.

According to the present embodiment, it is possible to expand a communicable range without increasing the time required for communication.

DETAILED DESCRIPTION OF PREFERRED EMBODIMENTS

An embodiment of the present invention is described in detail with reference to the drawings. It is to be noted that the same or corresponding portion in one figure as or to a portion in another is provided with the same numeral as that of the portion in another, and a description of the portion is not repeated.

Hereinafter, as a typical example of a system including a communication device for performing the near field communication, the RFID system is described. The communication device is often called a "reader-writer" in the typical RFID system as attention is focused on its function. Hence, also in the following description, the communication device is called the "reader-writer." However, it is not essential for the communication device to include both the function of reading data from an RF tag (a reader function) and the function of writing data into the RF tag (a writer function). The communication device may include only one of those functions.

While the RF tag may be called an IC (Integrated Circuit) tag or an RFID tag, the term "RF tag" is used hereinafter for convenience of description.

The RFID is described as a typical example of the near field communication, but this is not restrictive. For example, a new method obtained by making improvement on the basis of the RFID technique in the future can be included in the technical scope of the present invention.

A. Configuration of Reader-Writer

Figure 1:
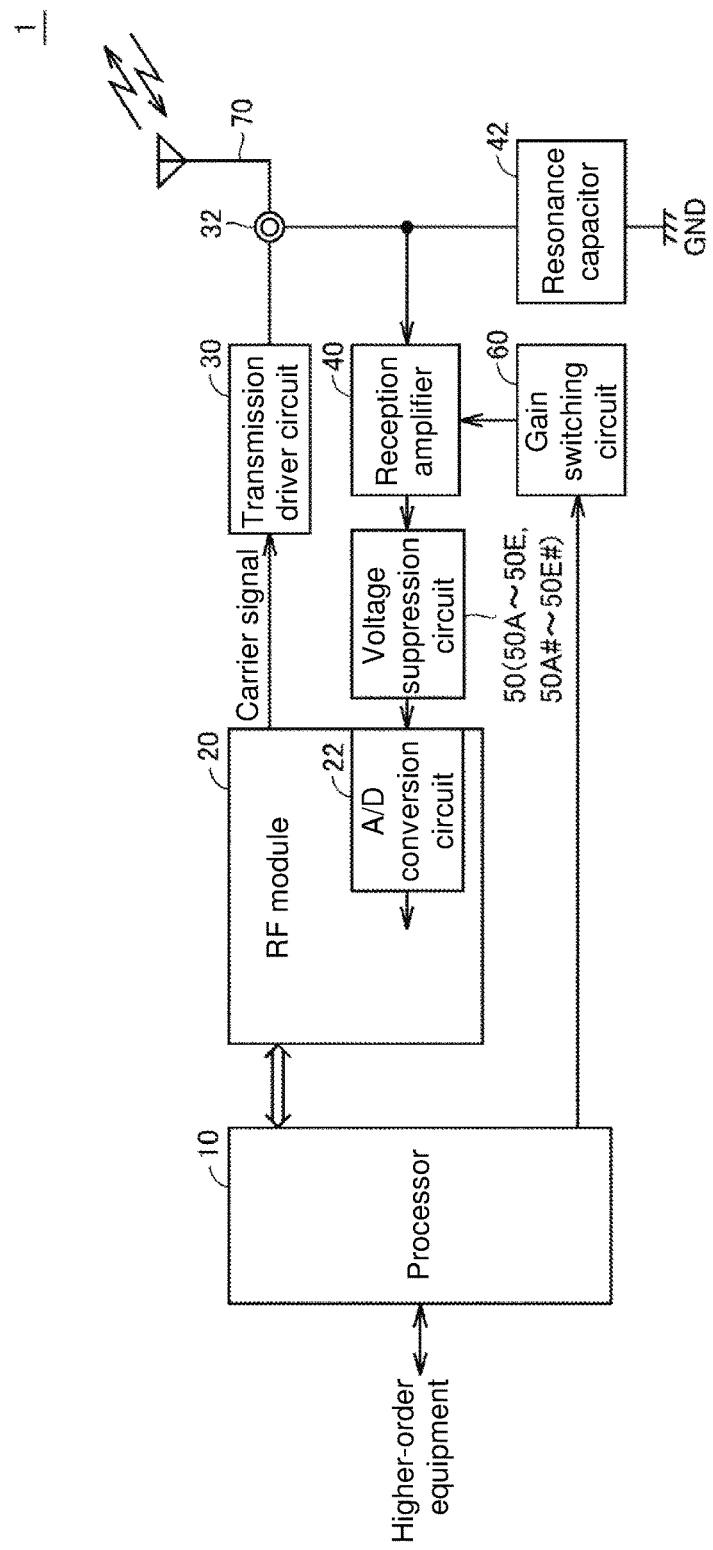
FIG. 1 is a schematic diagram showing a hardware configuration of a reader-writer according to an embodiment of the present invention.

First, a description is given of a configuration of a reader-writer 1 according to the present embodiment. FIG. 1 is a schematic diagram showing a hardware configuration of the reader-writer 1 according to the embodiment of the present invention.

With reference to FIG. 1, the reader-writer 1 includes as main components a processor 10, an RF module 20 including an A/D (Analog to Digital) conversion circuit 22, a transmission driver circuit 30, a reception amplifier 40, a voltage suppression circuit 50, and a gain switching circuit 60.

The RF module 20 and the transmission driver circuit 30 generate an electromagnetic wave to be radiated to the RF tag. The reception amplifier 40, the voltage suppression circuit 50, and the A/D conversion circuit 22 of the RF module 20 receive and decode the electromagnetic wave responded by the RF tag.

FIG. 1 shows a configuration where an antenna 70 is electrically connected to a terminal 32 as a component of the reader-writer 1. However, the antenna 70 may be taken as a separate component from the reader-writer 1. In this case, a lead is provided from the terminal 32 of the reader-writer 1 to a position where the antenna 70 is to be installed. Further, the number of antennas 70 and the shape thereof may be designed as appropriate in accordance with an installation environment or condition, or the like, in facilities or a device for the installation.

A resonance capacitor 42 is electrically connected between a ground potential (GND) and the terminal 32 electrically connected with the antenna 70. The resonance capacitor 42 matches output impedance of the transmission driver circuit 30 with the antenna 70. A capacitance of the resonance capacitor 42 is designed as appropriate in accordance with aimed transmission characteristics (transmission electric power, frequency characteristics, and the like).

The processor 10 is a calculation processing unit for controlling a variety of processing in the reader-writer 1. The processor 10 typically executes a program, not shown, to achieve processing required in the reader-writer 1. It is to be noted that all or some of functions of the processor 10 may be achieved by using hardware such as an Application Specific Integrated Circuit (ASIC). The processor 10 may have a communication interface, not shown, and be able to exchange data with higher-order equipment.

The RF module 20 processes an electromagnetic wave (RF signal) exchanged between the reader-writer 1 and the RF tag. Specifically, upon reception of an internal command from the processor 10, the RF module 20 superimposes a prescribed bit number of a command signal corresponding to the internal command on a reference wave from an oscillation circuit, not shown, to generate a high-frequency pulse (hereinafter also referred to as "carrier signal") as a base of a carrier wave.

The transmission driver circuit 30 amplifies the carrier signal generated in the RF module 20, and supplies the amplified signal to the antenna 70 via the terminal 32. That is, the transmission driver circuit 30 is electrically connected with the terminal 32, generates an electromagnetic wave (first radio signal) superimposed with a predetermined command signal, and transmits the generated signal from the antenna 70. Then, an electromagnetic wave is transmitted from the antenna 70.

The frequency of the electromagnetic wave radiated to the RF tag is set as appropriate in accordance with a reachable distance, or the like. For example, in accordance with a frequency specified in the ISO/IEC (International Organization for Standardization/International Electrotechnical Commission) standard, an electromagnetic wave with a band of 134.2 kHz, 530 kHz, 13.56 MHz, 920 MHz, or the like can be employed.

When the electromagnetic wave transmitted from the antenna 70 is incident on the RF tag, not shown, induced electromotive force is generated in the RF tag by the received electromagnetic wave, and a control circuit on the inside is activated by the induced electromotive force. The control circuit on the inside of the RF tag decodes the command signal superimposed on the carrier signal and executes processing in accordance with the command acquired by the decoding. The control circuit then generates a response signal containing the processing result, to eventually respond to the reader-writer 1.

The antenna 70 receives the response signal from the RF tag and inputs it into the reception amplifier 40. The reception amplifier 40 amplifies the response signal by a predetermined reception gain, and gives the amplified response signal to the voltage suppression circuit 50. That is, the reception amplifier 40 is electrically connected with the terminal 32, and receives from the antenna 70 the response signal (second radio signal) generated by the RF tag after reception of the electromagnetic wave (first radio signal) superimposed with the command signal. The reception amplifier 40 then amplifies the response signal.

The A/D conversion circuit 22 of the RF module 20 detects the intensity (typically a signal voltage) of the signal having been amplified by the reception amplifier 40. That is, the A/D conversion circuit 22 quantizes the response signal (analog signal) from the voltage suppression circuit 50 to generate a digital signal. The RF module 20 decodes the generated digital signal, generates a result of reception from the RF tag, and outputs the generated reception result to the processor 10.

The voltage suppression circuit 50 suppresses the intensity of the signal so as not to exceed a predetermined upper limit, the signal having been amplified by the reception amplifier 40 and being inputted into the A/D conversion circuit 22. A detail of the voltage suppression circuit 50 is described later. The response signal with the intensity having been suppressed in the voltage suppression circuit 50 is given to the RF module 20.

Upon reception of an internal command from the processor 10, the gain switching circuit 60 changes the reception gain for regulating the amplification degree in the reception amplifier 40. The reception amplifier 40 is typically able to switch the gain on two stages (a short distance mode and a long distance mode).

The contactless communication with the RF tag can be established by the operation of each component as thus described.

B. Improvement in Communication Stability

Next, a description is given of an outline of a technique for improving the communication stability in the reader-writer 1 of the present embodiment.

Figure 2A:
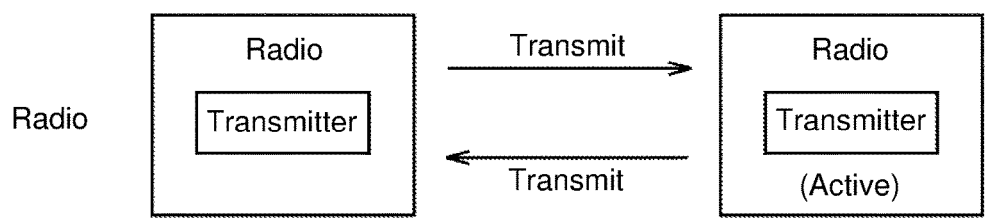
FIGS. 2A and 2B are diagrams for explaining characteristics of an RFID system.
Figure 2B:
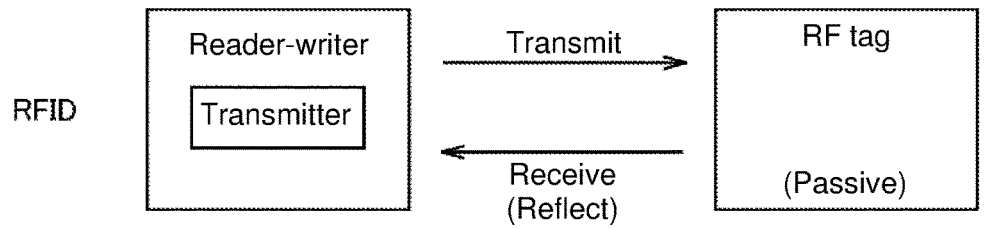

FIGS. 2A and 2B are diagrams for explaining characteristics of an RFID system. FIG. 2A shows a general configuration of a radio system, and FIG. 2B shows a configuration of the RFID system.

With reference to FIG. 2A, when radios communicate with each other, each of the radios has the function of generating a radio signal. Considering signal exchange where one radio transmits some signal to the other radio and receives a response signal from the other radio, the signal intensity of the response signal can be adjusted as appropriate in the other radio. Since such active exchange of a radio signal is possible, the signal intensity can be relatively easily adjusted in accordance with a distance between the radios.

In contrast, in the RFID system as shown in FIG. 2B, the reader-writer and the RF tag are in passive communication, and the signal intensity of the response signal from the RF tag thus cannot be controlled in the RF tag. That is, the signal intensity of the response signal from the RF tag is previously decided in accordance with the signal intensity of an inquiry signal transmitted from the reader-writer and the distance between the reader-writer and the RF tag.

When the signal intensity of the inquiry signal from the reader-writer is increased so that the reader-writer communicates with the RF tag located distant from the reader-writer, in the case of the RF tag being near the reader-writer, the signal intensity of the response signal from the RF tag to the reader-writer becomes excessively high to make it impossible to appropriately execute the reception processing and the decoding processing. On the other hand, without the increase in signal intensity of the inquiry signal, a communicable distance of the reader-writer to the RF tag (communicable area range) is short (narrow). The reader-writer according to the present embodiment is aimed at expanding the communicable area as much as possible in such a trade-off relation as described above.

Figure 3C:
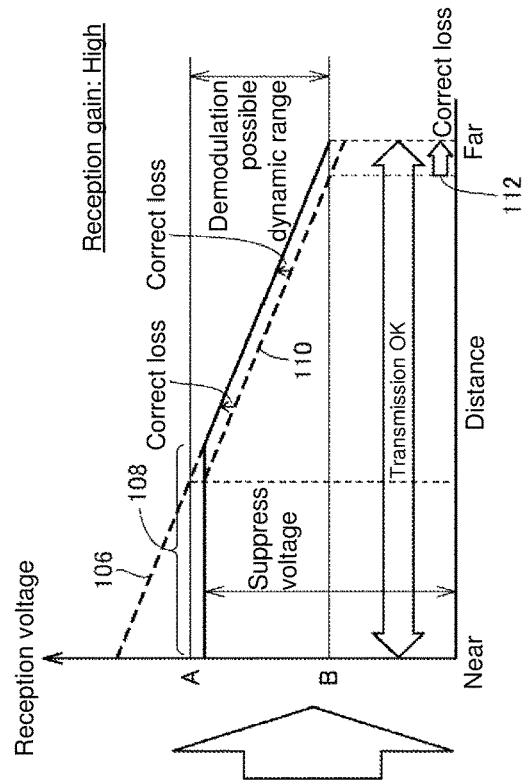
FIGS. 3A to 3C are diagrams for explaining processing for improving communication stability in the reader-writer according to the embodiment of the present invention.
Figure 3A:
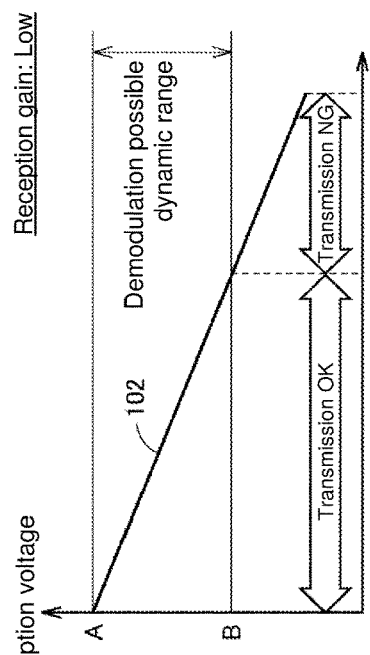
Figure 3B:
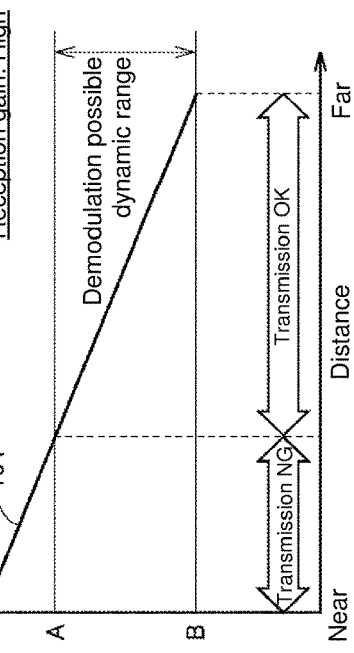

FIGS. 3A to 3C are diagrams for explaining the processing for improving the communication stability in the reader-writer 1 according to the embodiment of the present invention. FIG. 3A shows a characteristic 102 of the distance between the reader-writer 1 and the RF tag and the voltage of the reception signal (reception voltage) outputted from the reception amplifier 40 (FIG. 1) in a case where the reception gain of the reception amplifier 40 is set on the low side (short distance mode). FIG. 3B shows a characteristic 104 of the distance between the reader-writer 1 and the RF tag and the voltage of the reception signal (reception voltage) outputted from the reception amplifier 40 (FIG. 1) in a case where the reception gain of the reception amplifier 40 is set on the high side (long distance mode).

The amplified reception signal outputted from the reception amplifier 40 is inputted into the A/D conversion circuit 22 of the RF module 20. The range of the reception voltage in which the A/D conversion circuit 22 can output the digital signal without saturation is shown as a demodulation possible dynamic range.

As shown in FIG. 3A, in the case of the reception gain being set on the low side, amplification quantity of the reception signal is relatively small. Therefore, when the distance from the reader-writer 1 to the RF tag exceeds a certain level and becomes long, the signal intensity of the response signal from the RF tag falls below the demodulation possible dynamic range (a "communication NG" range in FIG. 3A). As a result, it is not possible to perform appropriate demodulation (A/D conversion) in the A/D conversion circuit 22.

On the other hand, as shown in FIG. 3B, in the case of the reception gain being set on the high side, the amplification quantity of the reception signal is relatively large. Therefore, when the distance from the reader-writer 1 to the RF tag exceeds a certain level and becomes short, the signal intensity of the response signal from the RF tag exceeds the demodulation possible dynamic range (a "communication NG" range in FIG. 3B). Also in this case, it is not possible to perform appropriate demodulation (A/D conversion) in the A/D conversion circuit 22.

FIG. 3C is a diagram showing a result of input of the reception signal outputted from the reception amplifier 40 into the voltage suppression circuit 50 (FIG. 1), and output of the inputted reception signal, in the reader-writer 1 according to the present embodiment. In this case, basically, the reception gain is set on the high side, and the response signal from the RF tag generates a characteristic 106 similar to the characteristic 104 of FIG. 3B in accordance with the distance between the reader-writer 1 and the RF tag. At this time, the voltage suppression circuit 50 suppresses the reception voltage of a range 108 (a range corresponding to the "communication NG" in FIG. 3B) where the signal intensity of the response signal from the RF tag exceeds the demodulation possible dynamic range. In other words, the voltage suppression circuit 50 suppresses the signal intensity of the response signal from the RF tag so as not to exceed the demodulation possible dynamic range. Performing such voltage suppression can expand the range in which the response signal from the RF tag can be appropriately received (the communicable area).

In addition, since a loss occurs to a certain degree in the voltage suppression circuit 50, there is generated a characteristic 110 where the voltage is outputted from the suppression circuit 50, the voltage having decreased to a certain degree with respect to the characteristic 106 where the voltage is outputted from the reception amplifier 40. As a result, when the distance between the reader-writer 1 and the RF tag is long, a range 112 below the demodulation possible dynamic range could be generated. In such a case, loss correction for compensating the voltage drop may be performed. However, the loss correction function is not an essential configuration, but is a function to be employed as appropriate.

C. Circuit Configuration of Communication Device

Hereinafter, there are described several configuration examples of the voltage suppression circuit 50 for achieving the voltage suppression function. There are also described configuration examples for achieving the loss correction function in addition to the voltage suppression function.

c1: Circuit Configuration Example 1

Figure 4A:
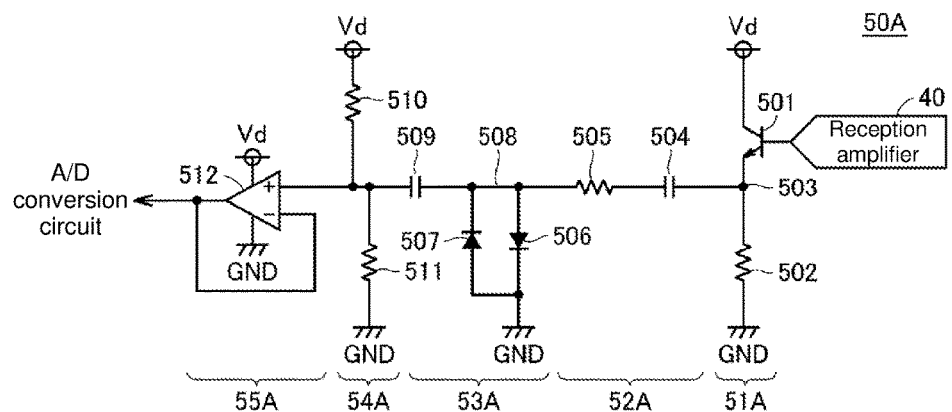
FIGS. 4A and 4B are schematic diagrams showing a circuit configuration example 1 of a voltage suppression circuit of the reader-writer according to the embodiment of the present invention.
Figure 4B:
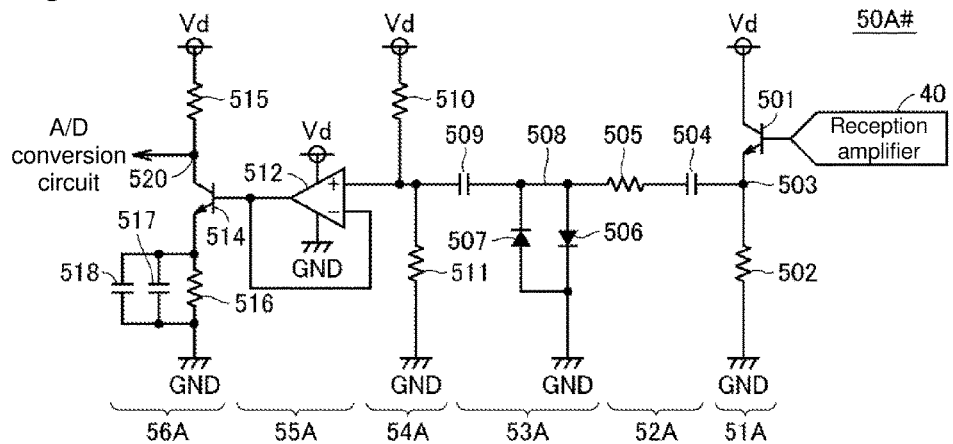

FIGS. 4A and 4B are schematic diagrams showing a circuit configuration example 1 of the voltage suppression circuit of the reader-writer 1 according to the embodiment of the present invention. With reference to FIG. 4A, a voltage suppression circuit 50A as the circuit configuration example 1 includes an input buffer 51A, an AC (Alternating Current) coupling 52A, a voltage suppressor 53A, a bias unit 54A, and an output buffer 55A.

The voltage suppression circuit 50A extracts an AC component contained in the signal having been amplified by the reception amplifier 40 and sets an upper limit and a lower limit of the amplitude. In the voltage suppression circuit 50A, the reception signal outputted from the reception amplifier 40 is applied with a DC component in a pre-stage of the output buffer 55A, and subjected to non-inverting amplification in the output buffer 55A.

The input buffer 51A amplifies the reception signal outputted from the reception amplifier 40. The input buffer 51A amplifies a signal before extracting the AC component. More specifically, the input buffer 51A includes a transistor 501 and a resistor 502 connected in series between a power supply voltage Vd and a ground potential GND. A collector of the transistor 501 is electrically connected with the power supply voltage Vd, and an emitter thereof is electrically connected with the ground potential GND. A current in accordance with a reception signal inputted from the reception amplifier 40 into a base of the transistor 501 flows between the collector and the emitter of the transistor 501. At a node 503, there is generated a voltage signal in accordance with the current flowing between the collector and the emitter of the transistor 501 and a resistance value of the resistor 502. This voltage signal is inputted into the AC coupling 52A.

The AC coupling 52A removes the DC component from the reception signal having been amplified in the input buffer 51A. That is, the AC coupling 52A extracts the AC component contained in the amplified signal inputted from the reception amplifier 40. The AC coupling 52A includes a capacitor 504 and a resistor 505 connected in series, and functions as a high-pass filter. That is, a voltage signal mainly containing the AC component alone is generated in a line 508.

The voltage suppressor 53A suppresses a portion exceeding the predetermined upper limit in the voltage signal which mainly contains the AC component alone and is outputted from the AC coupling 52A. More specifically, the voltage suppressor 53A includes a pair of diodes 506, 507 connected in different directions from each other, between the line 508 and the ground potential GND. When the magnitude of the positive side of the voltage signal generated in the line 508 exceeds an absolute value of a forward voltage of the diode 506, the diode 506 comes into a conduction state, to suppress the positive-side voltage value in the line 508 to the magnitude of the forward voltage of the diode 506. When the magnitude of the negative side of the voltage signal generated in the line 508 exceeds an absolute value of a forward voltage of the diode 507, the diode 507 comes into a conduction state, to suppress the negative-side voltage value in the line 508 to the magnitude of the forward voltage of the diode 507. That is, the voltage suppressor 53A is a clip circuit in a positive direction and a negative direction. As for the diodes 506, 507, for example, a Schottky diode with excellent reverse recovery characteristics, or the like, may be used.

The line 508 is electrically connected to the bias unit 54A via a capacitor 509.

The capacitor 509 removes the DC component of the voltage signal generated in the line 508.

The bias unit 54A applies a DC component as an offset to the voltage signal outputted from the voltage suppressor 53A. That is, after extraction of the AC component contained in the signal having been amplified by the reception amplifier 40 and setting of the upper and lower limits of the amplitude, the bias unit 54A adds the DC component to the signal and outputs the signal to the A/D conversion circuit 22 of the RF module 20. More specifically, the bias unit 54A includes a resistor 510 and a resistor 511 connected in series between a power supply voltage Vd and a ground potential GND. The DC component in accordance with a ratio of resistance values of the resistor 510 and the resistor 511 is applied to the voltage signal inputted into the bias unit 54A.

The output buffer 55A is a single power supply amplifier provided in an output stage to the A/D conversion circuit 22 of the RF module 20. The output buffer 55A prevents impedance of the A/D conversion circuit 22 from affecting the circuit operation of each of the AC coupling 52A, the voltage suppressor 53A, and the bias unit 54A. More specifically, the output buffer 55A includes an operation amplifier 512. An output of the operation amplifier 512 is fed back as it is to the negative side of the input (negative feedback).

Accordingly, a voltage signal given to the positive side of the input of the operation amplifier 512 is subjected to the non-inverting amplification.

Eventually, the output of the output buffer 55A (operation amplifier 512) is inputted into the A/D conversion circuit 22.

The circuit operation as described above suppresses the voltage magnitude such that the signal intensity of the response signal from the RF tag is held within the demodulation possible dynamic range as shown in FIG. 3. The suppression characteristics of the reception voltage inputted into the A/D conversion circuit 22 depend on the magnitude of the forward voltage in the diodes 506, 507 of the voltage suppressor 53A. For this reason, the diodes 506, 507 having appropriate forward voltage characteristics are selected in accordance with the dynamic range of the A/D conversion circuit 22, the reception gain of the reception amplifier 40, the transmission gain of the transmission driver circuit 30, and the like.

Next, FIG. 4B shows a circuit configuration of a voltage suppression circuit 50A# added with the loss correction function. With reference to FIG. 4B, the voltage suppression circuit 50A# is provided with a loss correction unit 56A in the output stage of the voltage suppression circuit 50A shown in FIG. 4A. The circuit configuration other than the loss correction unit 56A is similar to that of the voltage suppression circuit 50, and hence a detailed description thereof is not repeated.

The loss correction unit 56A is a circuit provided in the output stage of the voltage suppression circuit 50A and configured to compensate a loss that occurs due to the signal suppression. The loss correction unit 56A amplifies a voltage signal outputted from the output buffer 55A.

More specifically, the loss correction unit 56A includes the transistor 514. A collector of the transistor 514 is electrically connected with the power supply voltage Vd via the resistor 515, and an emitter thereof is electrically connected with the ground potential GND via the resistor 516 and capacitors 517, 518 which are connected in parallel to each other. A current in accordance with a voltage signal inputted from the operation amplifier 512 into a base of the transistor 514 flows between a collector and an emitter of a transistor 514. At a node 520, there is generated a voltage signal in accordance with the current flowing between the collector and the emitter of the transistor 514 and a resistance value of the resistor 515. This voltage signal is inputted into the A/D conversion circuit 22. The resistance value of the resistor 515 is decided in accordance with the maximum value of the current permitted to flow between the collector and the emitter of the transistor 514. The resistance value of the resistor 516 is decided so as to stabilize the amplification operation of the transistor 514. A capacitance (synthesized capacitance) of the capacitors 517, 518 is decided such that every AC component contained in the current flowing between the collector and the emitter of the transistor 514 has sufficiently low impedance. It is to be noted that FIG. 4B shows the example where two capacitors are connected in parallel so as to ensure a required capacitance, but a single capacitor or a larger number of capacitors may be used.

Providing the loss correction unit 56A as thus described in the output stage can compensate a loss (decrease in signal-to-noise ratio) that occurs due to mounting of the function to suppress a voltage. Therefore, even when the RF tag is disposed in a position distant from the reader-writer 1, stable communication can be established between the reader-writer 1 and the RF tag.

c2: Circuit Configuration Example 2

Figure 5A:
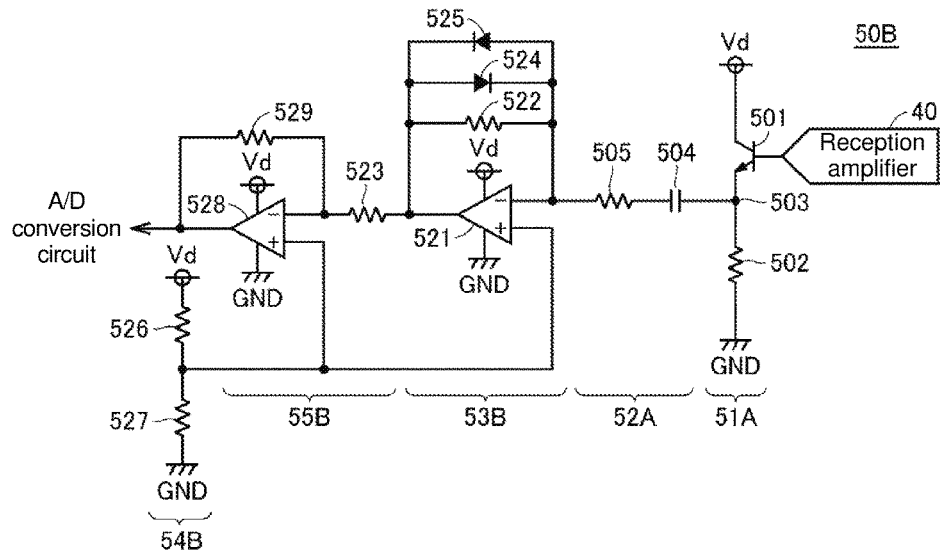
FIGS. 5A and 5B are schematic diagrams showing a circuit configuration example 2 of the voltage suppression circuit of the reader-writer according to the embodiment of the present invention.
Figure 5B:
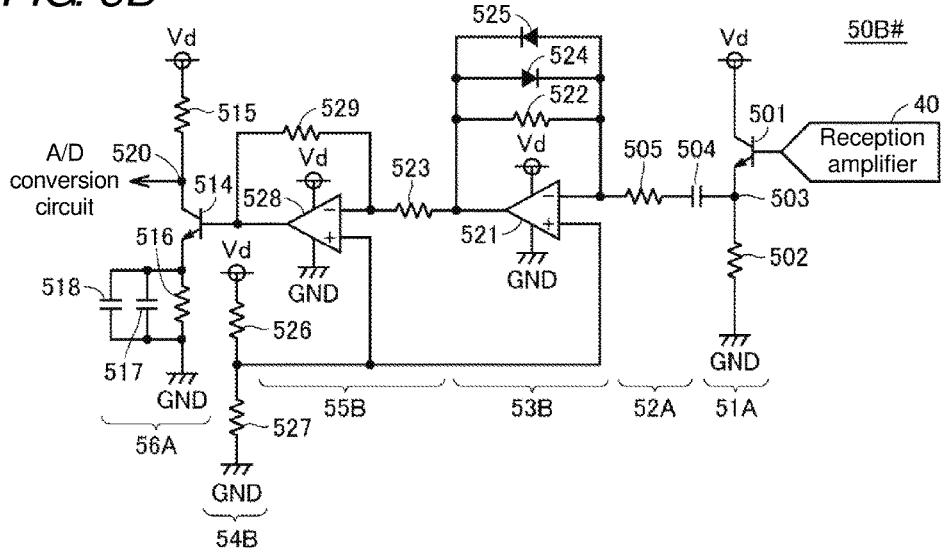

FIGS. 5A and 5B are schematic diagrams showing a circuit configuration example 2 of the voltage suppression circuit of the reader-writer 1 according to the embodiment of the present invention. With reference to FIG. 5A, a voltage suppression circuit 50B as the circuit configuration example 2 includes an input buffer 51A, an AC coupling 52A, a voltage suppressor 53B, a bias unit 54B, and an output buffer 55B.

The voltage suppression circuit 50B extracts an AC component contained in the signal having been amplified by the reception amplifier 40 and sets an upper limit and a lower limit of the amplitude. In the voltage suppression circuit 50B, the reception signal outputted from the reception amplifier 40 is applied with a DC component in a pre-stage of the output buffer 55B, and subjected to inverting amplification in the output buffer 55B.

Since the input buffer 51A and the AC coupling 52A respectively have the same circuit configurations as those of the input buffer 51A and the AC coupling 52A shown in FIG. 4A, detailed descriptions of those are not repeated.

The voltage suppressor 53B suppresses a portion exceeding the predetermined upper limit in the voltage signal which mainly contains the AC component alone and is outputted from the AC coupling 52A. More specifically, the voltage suppressor 53B includes an operation amplifier 521. Between an output of the operation amplifier 521 and the negative side of an input of the operation amplifier 521, a resistor 522 and a pair of diodes 524, 525 are connected in parallel to each other. The diode 524 and the diode 525 are connected in different directions from each other.

When a ground potential (GND) is given to the positive side of the input of the operation amplifier 521, the operation amplifier 521 performs the inverting amplification on the voltage signal given to the negative side of the input, with an amplification factor in accordance with a ratio of the resistance value of the resistor 522 with respect to the resistance value of the resistor 505 located in the pre-stage. Then, the operation amplifier 521 outputs the voltage signal. When the current which is fed back to the negative side of the input of the operation amplifier 521 becomes excessively large and a voltage generated at each end of the resistor 522 exceeds the forward voltage of the diode 524 or the diode 525, the diode with the exceeded forward voltage comes into the conduction state. When one of the diodes 524, 525 comes into the conduction state, a resistance value (impedance) between the output of the operation amplifier 521 and the negative side of the input of the operation amplifier 521 significantly decreases. This leads to a significant decrease in amplification factor of the operation amplifier 521.

That is, when the voltage signal given to the positive side of the input of the operation amplifier 521 is excessively large, one of the diodes 524, 525 comes into the conduction state, thereby suppressing further amplification in the operation amplifier 521. As a result, the voltage value of the output of the operation amplifier 521 is suppressed.

The output buffer 55B is a single power supply amplifier provided in an output stage to the A/D conversion circuit 22 of the RF module 20. The output buffer 55B prevents impedance of the A/D conversion circuit 22 from affecting the circuit operation of each of the AC coupling 52A and the voltage suppressor 53B. More specifically, the output buffer 55B includes an operation amplifier 528 and resistors 523, 529. When a ground potential (GND) is given to the positive side of the input of the operation amplifier 528, the operation amplifier 528 performs the inverting amplification on the voltage signal given to the negative side of the input, with an amplification factor in accordance with a ratio of the resistance value of the resistor 529 with respect to the resistance value of the resistor 523 located in the pre-stage. Then, the operation amplifier 528 outputs the voltage signal.

Since the inverting amplification is performed in each of the voltage suppressor 53B and the output buffer 55B, a signal of the same phase as that of the reception signal outputted from the reception amplifier 40 is outputted from the output buffer 55B (operation amplifier 528).

The bias unit 54B adds the DC component (offset) removed in the AC coupling 52A. That is, after extraction of the AC component contained in the signal having been amplified by the reception amplifier 40 and setting of the upper and lower limits of the amplitude, the bias unit 54B adds the DC component to the signal and outputs the signal to the A/D conversion circuit 22 of the RF module 20. More specifically, the bias unit 54B includes a resistor 526 and a resistor 527 connected in series between a power supply voltage Vd and a ground potential GND. The bias unit 54B generates a DC voltage in accordance with a ratio of resistance values of the resistor 526 and the resistor 527, and inputs the DC voltage into the positive side of the input of each of the operation amplifiers 521, 528. In each of the operation amplifiers 521, 528, the DC component from the bias unit 54B is added as an offset to the inputted voltage signal, and the inverting amplification is then performed. By the addition of the offset and the inverting amplification as thus described, the voltage signal containing a prescribed bias voltage is outputted to the A/D conversion circuit 22.

The circuit operation as described above suppresses the voltage magnitude such that the signal intensity of the response signal from the RF tag is held within the demodulation possible dynamic range as shown in FIG. 3. The suppression characteristics of the reception voltage inputted into the A/D conversion circuit 22 depend on the magnitude of the forward voltage in the diodes 524, 525 connected to the operation amplifier 521 of the voltage suppressor 53B. For this reason, the diodes 524, 525 having appropriate forward voltage characteristics are selected in accordance with the dynamic range of the A/D conversion circuit 22, the reception gain of the reception amplifier 40, the transmission gain of the transmission driver circuit 30, and the like.

FIG. 5B shows a circuit configuration of a voltage suppression circuit 50B# added with the loss correction function. With reference to FIG. 5B, the voltage suppression circuit 50B# is provided with a loss correction unit 56A in the output stage of the voltage suppression circuit 50B shown in FIG. 5A. Since the circuit configuration and the circuit operation of the loss correction unit 56A have been described in detail with reference to FIG. 4B, detailed descriptions thereof are not repeated.

Providing the loss correction unit 56A as thus described in the output stage can compensate a loss (decrease in signal-to-noise ratio) that occurs due to mounting of the function to suppress a voltage. Therefore, even when the RF tag is disposed in a position distant from the reader-writer 1, stable communication can be established between the reader-writer 1 and the RF tag.

c3: Circuit Configuration Example 3

Figure 6A:
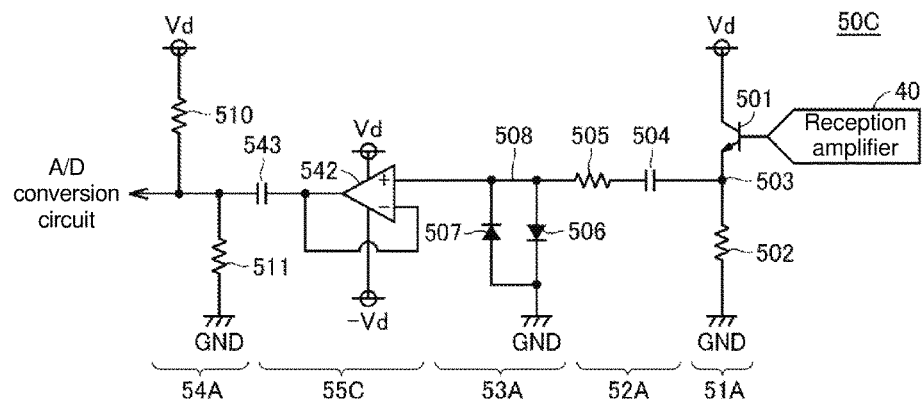
FIGS. 6A and 6B are schematic diagrams showing a circuit configuration example 3 of the voltage suppression circuit of the reader-writer according to the embodiment of the present invention.
Figure 6B:
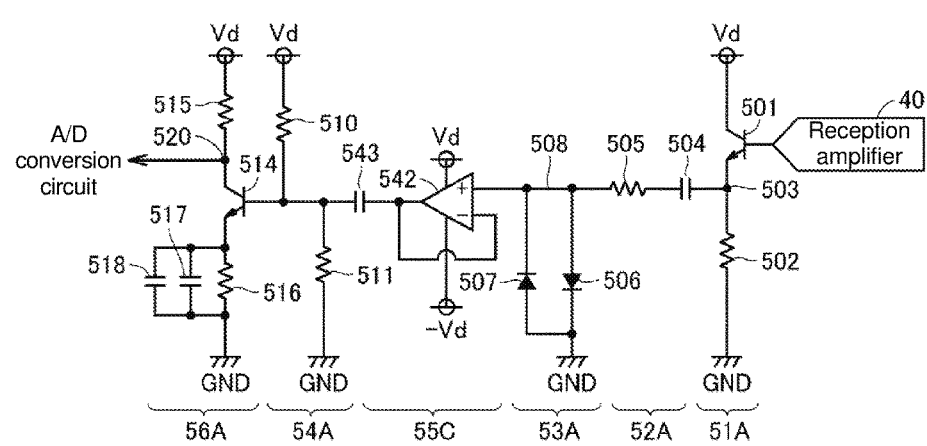

FIGS. 6A and 6B are schematic diagrams showing a circuit configuration example 3 of the voltage suppression circuit of the reader-writer 1 according to the embodiment of the present invention. With reference to FIG. 6A, a voltage suppression circuit 50C as the circuit configuration example 3 includes an input buffer 51A, an AC coupling 52A, a voltage suppressor 53A, a bias unit 54A, and an output buffer 55C.

The voltage suppression circuit 50C extracts an AC component contained in the signal having been amplified by the reception amplifier 40 and sets an upper limit and a lower limit of the amplitude. In the voltage suppression circuit 50C, the reception signal outputted from the reception amplifier 40 is applied with a DC component in a post-stage of the output buffer 55C, and subjected to the non-inverting amplification in the output buffer 55C.

Since the input buffer 51A, the AC coupling 52A, the voltage suppressor 53A, and the bias unit 54A respectively have the same circuit configurations as those of the input buffer 51A, the AC coupling 52A, the voltage suppressor 53A, and the bias unit 54A shown in FIG. 4A, detailed descriptions of those are not repeated.

The output buffer 55C is a dual power supply amplifier provided in an output stage to the A/D conversion circuit 22 of the RF module 20. The output buffer 55C prevents impedance of the A/D conversion circuit 22 from affecting the circuit operation of each of the AC coupling 52A and the voltage suppressor 53A. More specifically, the output buffer 55C includes an operation amplifier 542 that is supplied with both a power supply voltage +Vd on the positive side and a power supply voltage −Vd on the negative side. An output of the operation amplifier 542 is fed back as it is to the negative side of the input (negative feedback). Accordingly, a voltage signal given to the positive side of the input of the operation amplifier 542 is subjected to the non-inverting amplification.

Eventually, the output of the operation amplifier 542 is inputted into the bias unit 54A via the capacitor 543. The capacitor 543 removes the DC component contained in the output signal of the operation amplifier 542.

The circuit operation as described above suppresses the voltage magnitude such that the signal intensity of the response signal from the RF tag is held within the demodulation possible dynamic range as shown in FIG. 3. The suppression characteristics of the reception voltage inputted into the A/D conversion circuit 22 depend on the magnitude of the forward voltage in the diodes 506, 507 of the voltage suppressor 53A. For this reason, the diodes 506, 507 having appropriate forward voltage characteristics are selected in accordance with the dynamic range of the A/D conversion circuit 22, the reception gain of the reception amplifier 40, the transmission gain of the transmission driver circuit 30, and the like.

Further, in the voltage suppression circuit 50C shown in FIG. 6A, the operation amplifier 542 is driven by the power supply voltages on the positive side and the negative side, thus enabling a further increase in amplification factor. Hence it is possible to reduce the loss that occurs in the voltage suppression circuit 50C.

FIG. 6B shows a circuit configuration of a voltage suppression circuit 50C# added with the loss correction function. With reference to FIG. 6B, the voltage suppression circuit 50C# is provided with a loss correction unit 56A in the output stage of the voltage suppression circuit 50C shown in FIG. 6A. Since the circuit configuration and the circuit operation of the loss correction unit 56A have been described in detail with reference to FIG. 4B, detailed descriptions thereof are not repeated.

Providing the loss correction unit 56A as thus described in the output stage can compensate a loss (decrease in signal-to-noise ratio) that occurs due to mounting of the function to suppress a voltage. Therefore, even when the RF tag is disposed in a position distant from the reader-writer 1, stable communication can be established between the reader-writer 1 and the RF tag.

c4: Circuit Configuration Example 4

Figure 7A:
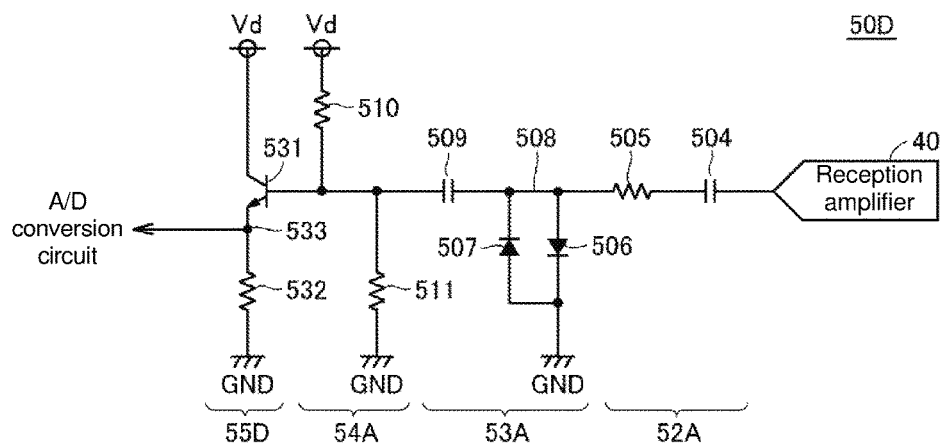
FIGS. 7A and 7B are schematic diagrams showing a circuit configuration example 4 of the voltage suppression circuit of the reader-writer according to the embodiment of the present invention.
Figure 7B:
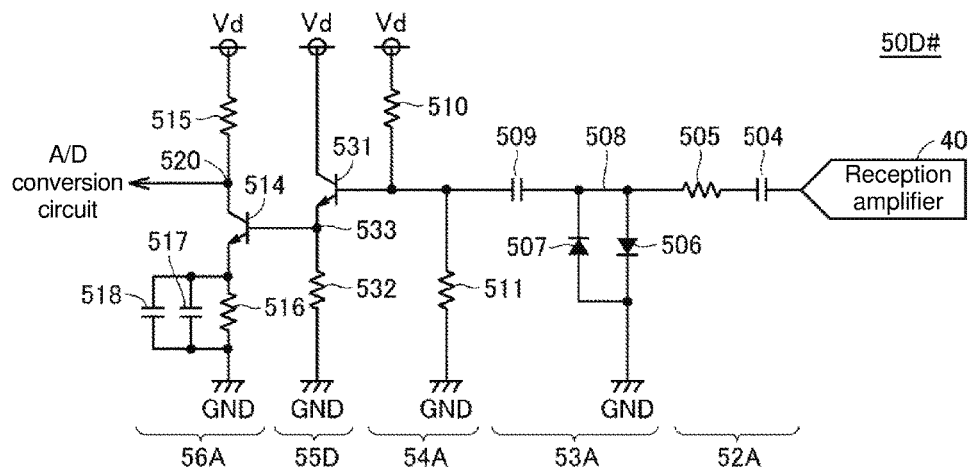

FIGS. 7A and 7B are schematic diagrams showing a circuit configuration example 4 of the voltage suppression circuit of the reader-writer 1 according to the embodiment of the present invention. With reference to FIG. 7A, a voltage suppression circuit 50D as the circuit configuration example 4 includes an AC coupling 52A, a voltage suppressor 53A, a bias unit 54A, and an output buffer 55D.

The voltage suppression circuit 50D extracts an AC component contained in the signal having been amplified by the reception amplifier 40 and sets an upper limit and a lower limit of the amplitude. In the voltage suppression circuit 50D, the reception signal outputted from the reception amplifier 40 is applied with a DC component in a pre-stage of the output buffer 55D, and subjected to the non-inverting amplification in the output buffer 55D. It is to be noted that in the voltage suppression circuit 50D, an input buffer for amplifying the reception signal outputted from the reception amplifier 40 is omitted.

Since the AC coupling 52A, the voltage suppressor 53A, and the bias unit 54A respectively have the same circuit configurations as those of the AC coupling 52A, the voltage suppressor 53A, and the bias unit 54A shown in FIG. 4A, detailed descriptions of those are not repeated.

The output buffer 55D is an amplifier using a transistor with its emitter grounded, and provided in an output stage to the A/D conversion circuit 22 of the RF module 20. The output buffer 55D prevents impedance of the A/D conversion circuit 22 from affecting the circuit operation of each of the AC coupling 52A, the voltage suppressor 53A, and the bias unit 54A. More specifically, the output buffer 55D includes a transistor 531 and a resistor 532 connected in series between a power supply voltage Vd and a ground potential GND. A collector of the transistor 531 is electrically connected with the power supply voltage Vd, and an emitter thereof is electrically connected with the ground potential GND. A current in accordance with a reception signal inputted from the reception amplifier 40 into a base of the transistor 531 flows between the collector and the emitter of the transistor 531. At a node 533, there is generated a voltage signal in accordance with the current flowing between the collector and the emitter of the transistor 531 and a resistance value of the resistor 532. This voltage signal is outputted to the A/D conversion circuit 22.

The circuit operation as described above suppresses the voltage magnitude such that the signal intensity of the response signal from the RF tag is held within the demodulation possible dynamic range as shown in FIG. 3. The suppression characteristics of the reception voltage inputted into the A/D conversion circuit 22 depend on the magnitude of the forward voltage in the diodes 506, 507 of the voltage suppressor 53A. For this reason, the diodes 506, 507 having appropriate forward voltage characteristics are selected in accordance with the dynamic range of the A/D conversion circuit 22, the reception gain of the reception amplifier 40, the transmission gain of the transmission driver circuit 30, and the like.

Further, employing the voltage suppression circuit 50D shown in FIG. 7A can make the circuit configuration simpler, thereby reducing the manufacturing cost.

Next, FIG. 7B shows a circuit configuration of a voltage suppression circuit 50D# added with the loss correction function. With reference to FIG. 7B, the voltage suppression circuit 50D# is provided with a loss correction unit 56A in the output stage of the voltage suppression circuit 50D shown in FIG. 7A. Since the circuit configuration and the circuit operation of the loss correction unit 56A have been described in detail with reference to FIG. 4B, detailed descriptions thereof are not repeated.

Providing the loss correction unit 56A as thus described in the output stage can compensate a loss (decrease in signal-to-noise ratio) that occurs due to mounting of the function to suppress a voltage. Therefore, even when the RF tag is disposed in a position distant from the reader-writer 1, stable communication can be established between the reader-writer 1 and the RF tag.

c5: Circuit Configuration Example 5

Figure 8A:
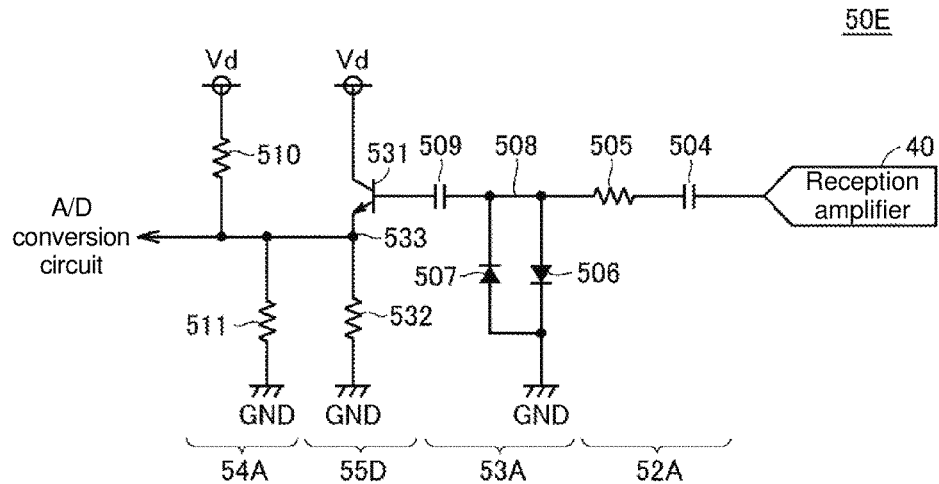
FIGS. 8A and 8B are schematic diagrams showing a circuit configuration example 5 of the voltage suppression circuit of the reader-writer according to the embodiment of the present invention.
Figure 8B:
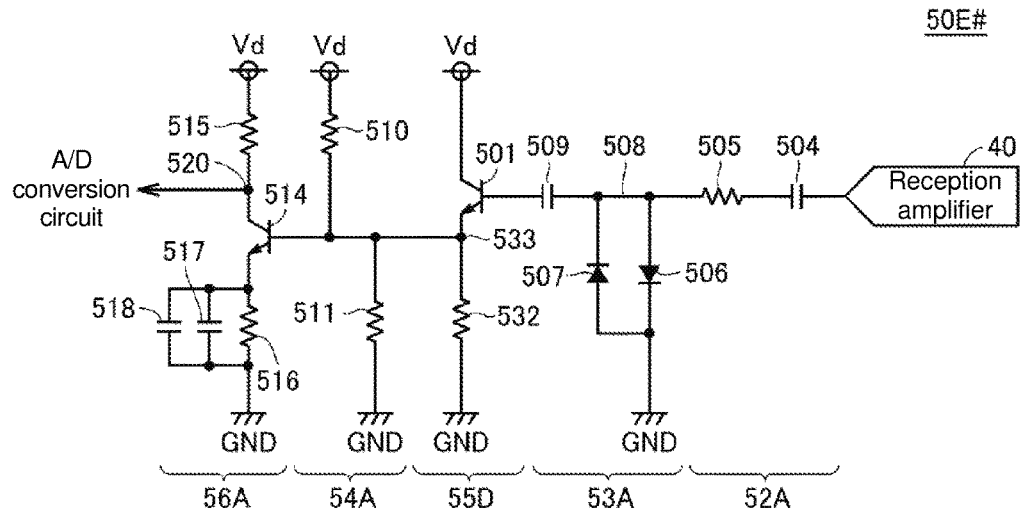

FIGS. 8A and 8B are schematic diagrams showing a circuit configuration example 5 of the voltage suppression circuit of the reader-writer 1 according to the embodiment of the present invention. With reference to FIG. 8A, a voltage suppression circuit 50E as the circuit configuration example 5 includes an AC coupling 52A, a voltage suppressor 53A, a bias unit 54A, and an output buffer 55D.

The voltage suppression circuit 50E extracts an AC component contained in the signal having been amplified by the reception amplifier 40 and sets an upper limit and a lower limit of the amplitude. In the voltage suppression circuit 50E, the reception signal outputted from the reception amplifier 40 is applied with a DC component in a post-stage of the output buffer 55D, and subjected to the non-inverting amplification in the output buffer 55D. It is to be noted that in the voltage suppression circuit 50E, an input buffer for amplifying the reception signal outputted from the reception amplifier 40 is omitted.

In the voltage suppression circuit 50E shown in FIG. 8A, the connecting relation between the bias unit 54A and the output buffer 55D is opposite to that in the voltage suppression circuit 50D shown in FIG. 7A. That is, in the voltage suppression circuit 50E shown in FIG. 8A, the output buffer 55D is disposed in a post-stage of the voltage suppressor 53A, and the bias unit 54A is disposed in a post-stage of the output buffer 55D. Since the circuit configuration and the circuit operation other than the above have been described in detail with reference to FIG. 7A, detailed descriptions thereof are not repeated.

The circuit operation as described above suppresses the voltage magnitude such that the signal intensity of the response signal from the RF tag is held within the demodulation possible dynamic range as shown in FIG. 3. The suppression characteristics of the reception voltage inputted into the A/D conversion circuit 22 depend on the magnitude of the forward voltage in the diodes 506, 507 of the voltage suppressor 53A. For this reason, the diodes 506, 507 having appropriate forward voltage characteristics are selected in accordance with the dynamic range of the A/D conversion circuit 22, the reception gain of the reception amplifier 40, the transmission gain of the transmission driver circuit 30, and the like.

Further, employing the voltage suppression circuit 50E shown in FIG. 8A can make the circuit configuration simpler, thereby reducing the manufacturing cost.

FIG. 8B shows a circuit configuration of a voltage suppression circuit 50E# added with the loss correction function. With reference to FIG. 8B, the voltage suppression circuit 50E# is provided with a loss correction unit 56A in the output stage of the voltage suppression circuit 50E shown in FIG. 8A. Since the circuit configuration and the circuit operation of the loss correction unit 56A have been described in detail with reference to FIG. 4B, detailed descriptions thereof are not repeated.

Providing the loss correction unit 56A as thus described in the output stage can compensate a loss (decrease in signal-to-noise ratio) that occurs due to mounting of the function to suppress a voltage. Therefore, even when the RF tag is disposed in a position distant from the reader-writer 1, stable communication can be established between the reader-writer 1 and the RF tag.

D. Verification Result

The present inventors have verified the effect of improvement in communication stability of the reader-writer including the voltage suppression circuit as described above. One example of results of the verification is shown below.

Figure 9:
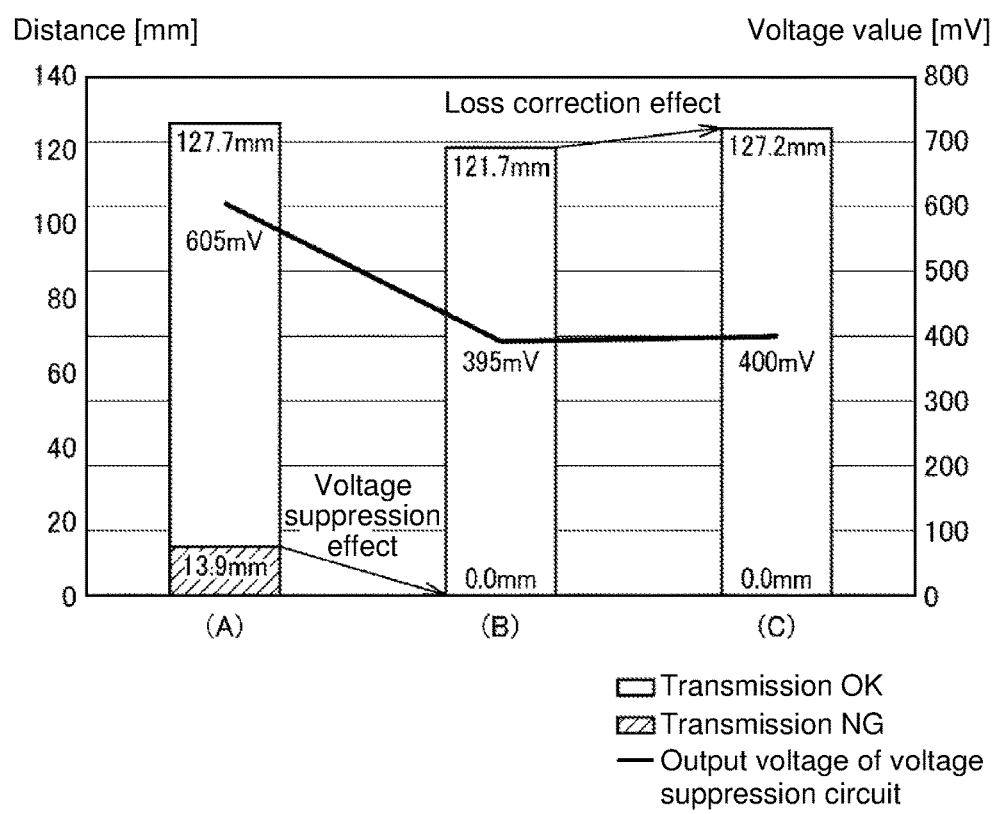
FIG. 9 is a diagram showing one example of a verification result of communication stability in the reader-writer according to the embodiment of the present invention.

FIG. 9 is a diagram showing one example of the verification results of the communication stability in the reader-writer 1 according to the embodiment of the present invention. FIG. 9 shows results of investigating whether or not the communication can be established by sequentially changing the distance between the reader-writer 1 and the RF tag, concerning the following three kinds of configurations: (A) the voltage suppression circuit 50 is not included (the output of the reception amplifier 40 is directly inputted into the RF module 20; (B) the voltage suppression circuit 50A shown in FIG. 4A is included; and (C) the voltage suppression circuit 50A# shown in FIG. 4B is included.

As seen from the comparison between the result of the FIG. 9(A) and the result of FIG. 9(B), even when the RF tag is disposed in the vicinity of the reader-writer 1, the voltage of the reception signal (reception voltage) is suppressed, and can thus be held within the demodulation possible dynamic range. It is thereby found that the short-distance-side range of the communicable area has been able to be expanded while the long-distance-side range thereof is substantially maintained.

Further, as shown in FIG. 9(C), employing the voltage suppression circuit with the loss correction function enables the long-distance-side range of the communicable area to be substantially maintained as wide as that of the circuit configuration having no voltage suppression circuit.

As thus described, it has been verified that the communicable area can be expanded by employing the voltage suppression circuit according to the present embodiment, thereby leading to improvement in communication stability.

E. Other Embodiments

The circuit diagram using the circuit components has been illustrated in each of FIGS. 4 to 8, but an arbitrary configuration can be employed as a mode for mounting this circuit. For example, the whole or part of the circuit may be integrated, or may be mounted by a lead pattern formed on a substrate. Further, the reception amplifier and the voltage suppression circuit have been separately described for explaining the voltage suppression circuit, but the voltage suppression circuit may be mounted in the circuit of the reception amplifier.

When the gain switching circuit 60 sets the reception gain of the reception amplifier 40 (FIG. 1) on either side, the foregoing voltage suppression circuit 50 functions. However, since the range of the reception voltage outputted from the reception amplifier 40 changes due to the change in reception gain, the suppression characteristics (values of the set upper and lower limits of the amplitude) may be switched in accordance with the above change in range.

F. Advantage

As described above, in the reader-writer 1 of the present embodiment, the intensity of the signal is suppressed so as not to exceed the predetermined upper limit, the signal having been amplified by the reception amplifier 40 and being inputted into the A/D conversion circuit 22 (detector) of the RF module 20. It is thereby possible to hold the reception voltage within the demodulation possible dynamic range even when the distance between the reader-writer 1 and the RF tag is short. Accordingly, the installation margin of the reader-writer (the communicable distance to the RF tag (the communicable area range)) can be increased, to improve the communication stability.

Further, according to the present embodiment, since there is no need for switching the reception gain in accordance with the distance between the reader-writer 1 and the RF tag, it is possible to expand the communicable range without increasing the time required for the communication.

The embodiments disclosed herein are illustrative in all aspects and should not be considered as restrictive. It is intended that the scope of the present invention is defined not by the above descriptions but by the claims, and includes meanings equivalent to the scope of the claims and all modifications within the scope.

The invention claimed is:
1. A communication device, comprising:
a terminal electrically connected with an antenna;
a transmitter electrically connected with the terminal, and configured to generate a first radio signal superimposed with a predetermined command signal and transmit the generated first radio signal from the antenna;
an amplifier electrically connected with the terminal and configured to receive from the antenna a second radio signal generated by a Radio Frequency (RF) tag receiving the first radio signal;
a detector configured to detect intensity of an amplified signal of the second radio signal having been amplified by the amplifier; and
a suppressor configured to suppress the intensity of the amplified signal to be inputted into the detector such that the intensity of the amplified signal does not exceed a predetermined upper limit, wherein
the suppressor extracts an alternating current (AC) component contained in the amplified signal and sets an upper limit and a lower limit of an amplitude of the amplified signal.

2. The communication device according to claim 1, wherein the suppressor includes a pair of diodes connected in different directions from each other.

3. The communication device according to claim 1, wherein the suppressor includes a first buffer configured to amplify the signal before extracting the AC component.

4. The communication device according to claim 1, wherein, after setting the upper and lower limits of the amplitude, the suppressor adds a direct current (DC) component to the signal and outputs the signal to the detector.

5. The communication device according to claim 1, wherein the suppressor includes a second buffer provided in an output stage to the detector.

6. The communication device according to claim 1, wherein the suppressor includes a circuit configured to compensate a loss that occurs due to signal suppression.

7. The communication device according to claim 5, wherein the second buffer comprises a dual power supply amplifier.

8. The communication device according to claim 5, wherein the second buffer comprises an amplifier including a transistor having an emitter thereof grounded.

9. The communication device according to claim 1, further comprising a processor coupled to at least some of the terminal, the transmitter, the amplifier, the detector, and the suppressor, the processor executing a program to perform operations to control the at least some of the terminal, the transmitter, the amplifier, the detector, and the suppressor to perform operations.

10. The communication device according to claim 9, wherein the processor comprises an Application Specific Integrated Circuit (ASIC).

11. The communication device according to claim 9, further comprising a gain switching circuit coupled to the amplifier, wherein upon reception of an internal command from the processor, the gain switching circuit changes the reception gain of the amplifier.

12. The communication device according to claim 11, wherein upon reception of the internal command from the processor, the gain switching circuit switches a gain of the amplifier between one of two gain stages.

13. The communication device according to claim 12, wherein the two gains stages comprise a short distance gain mode and a long distance gain mode.

14. The communication device according to claim 11, wherein when the gain switching circuit changes the reception gain of the amplifier, suppression characteristics of the suppressor are accordingly changed.

15. The communication device according to claim 1, wherein a frequency of at least the first radio signal is set as appropriate in accordance with a reachable distance to the RF tag.

16. The communication device according to claim 15, wherein the frequency comprises a frequency specified in the ISO/IEC (International Organization for Standardization/International Electrotechnical Commission) standard for RFID tag communication.

17. The communication device according to claim 15, wherein the frequency comprises at least one of: 134.2 kHz, 530 kHz, 13.56 MHz, and 920 MHz.

18. The communication device according to claim 1, wherein the detector comprises an Analog to Digital (A/D) conversion circuit that quantizes the amplified signal of the second radio signal to generate a digital signal.

19. The communication device according to claim 1, wherein at least the suppressor is mounted in a circuit of the amplifier.

* * * * *